United States Patent
Niederhüfner et al.

(10) Patent No.: US 7,736,239 B2
(45) Date of Patent: Jun. 15, 2010

(54) HOMOKINETIC JOINT HAVING A SEALING ARRANGEMENT

(75) Inventors: Manfred Niederhüfner, Hanau (DE); Claus Disser, Seligenstadt (DE)

(73) Assignee: Shaft-From-Engineering GmbH, Mühleim (DE)

( * ) Notice: Subject to any disclaimer, the term of this patent is extended or adjusted under 35 U.S.C. 154(b) by 616 days.

(21) Appl. No.: 10/569,865

(22) PCT Filed: Aug. 31, 2004

(86) PCT No.: PCT/EP2004/009688

§ 371 (c)(1),
(2), (4) Date: Mar. 14, 2006

(87) PCT Pub. No.: WO2005/024259

PCT Pub. Date: Mar. 17, 2005

(65) Prior Publication Data

US 2008/0194344 A1    Aug. 14, 2008

(30) Foreign Application Priority Data

Sep. 1, 2003   (DE) ................... 103 40 583

(51) Int. Cl.
*F16D 3/84* (2006.01)
(52) U.S. Cl. ................ 464/175; 464/906
(58) Field of Classification Search ........ 464/145, 464/175, 906, 173
See application file for complete search history.

(56) References Cited

U.S. PATENT DOCUMENTS

| 2,323,569 A | * | 7/1943 | Rzeppa ................ 464/173 |
| 3,017,756 A | | 1/1962 | Sharp |
| 3,688,521 A | * | 9/1972 | Smith et al. .......... 464/906 |
| 3,822,570 A | * | 7/1974 | Fisher ................. 464/906 |
| 4,630,834 A | | 12/1986 | Müller et al. |
| 4,747,805 A | | 5/1988 | Welschof et al. |
| 4,869,556 A | | 9/1989 | Gees |
| 5,297,996 A | | 3/1994 | Drags |
| 2007/0032303 A1 | * | 2/2007 | Disser et al. .......... 464/145 |

FOREIGN PATENT DOCUMENTS

| DE | 32 27 969 | 2/1984 |
| DE | 36 03 389 | 8/1987 |
| DE | 37 26 135 | 2/1989 |
| DE | 40 33 275 | 4/1992 |

* cited by examiner

*Primary Examiner*—Greg Binda
(74) *Attorney, Agent, or Firm*—Collard & Roe, P.C.

(57) ABSTRACT

A homokinetic joint includes an inner hub and an outer hub, wherein several pathways are associated together in pairs, wherein balls which are guided in a cage are received in order to transmit torque between the inner hub and the outer hub. A sealing arrangement includes a set of bellows and seals the homokinetic joint. The radially outer edge of the set of bellows is coupled to the outer hub and/or to a carrier housing engaging therewith. The radially inner edge is secured in a stationary manner on the inner hub.

7 Claims, 7 Drawing Sheets

HOMOKINETIC JOINT HAVING A SEALING ARRANGEMENT

CROSS REFERENCE TO RELATED APPLICATIONS

Applicants claim priority under 35 U.S.C. §119 of German Patent Application No. 103 40 583.6 filed Sep. 1, 2003. Applicants also claim priority under 35 U.S.C. §365 of PCT/EP2004/009688 filed Aug. 31, 2004. The international application under PCT article 21(2) was not published in English.

BACKGROUND OF THE INVENTION

1. Field of the Invention

The invention relates to a homokinetic joint having an inner hub and an outer hub, in which several tracks assigned to one another in pairs, are provided, in each instance, in which balls guided in a cage are accommodated to transfer a torque between the inner hub and the outer hub, and having a sealing arrangement for sealing the homokinetic joint on at least one side.

2. Description of the Related Art

Such homokinetic joints are used, for example, in longitudinal shafts and side shafts of motor vehicles, and must be provided with a lubricant, before or during installation, which ideally ensures good lubrication over the entire useful lifetime of the homokinetic joint. In order to prevent exit of the lubricant from the joint during operation and, at the same time, penetration of dirt particles or the like, such joints are sealed. Thus, for example, in DE 40 33 275 C2, a rolled or pleated set of bellows is proposed for a rotating homokinetic joint, which set of bellows is attached to a sheet-metal cap with its edge that faces the outer hub of the joint, and mounted on a shaft with its opposite edge, which shaft is connected with the inner hub of the homokinetic joint. Sealing of the joint can therefore only take place during or after assembly of the joint on the shaft. The assembly time for such a joint is thereby increased. Furthermore, it is possible that lubricant exits from the joint before assembly, or that dirt particles penetrate into the joint.

A similar set of bellows is also known from DE 36 03 389 C2, which is held on the outer part of the joint by means of a sheet-metal cap, and has a sleeve packing that rests on the shaft that is connected with the inner part of the joint. In the case of this set of bellows, as well, sealing of the joint is only possible after assembly of the shaft on the inner part of the joint.

A sealing arrangement for an articulated coupling is disclosed in DE 32 27 969 C2, which has a membrane-like sealing cuff. In this connection, the sealing cuff is attached to the outer coupling half by means of a taut band, and lies against a shaft connected with the inner coupling half with its radially inner edge. The sealing arrangement is configured as a membrane-like disk that can have several pleats that run radially.

The homokinetic joints currently being used in motor vehicles are subjected to very high speeds of rotation, in some cases more than 10,000 revolutions per minute. Therefore, high centrifugal forces act on the sealing arrangement, which, together with the high temperatures that occur in the joints, can result in premature failure of the sealing arrangement. Thus it is possible, for example, that a rolled or pleated set of bellows "inflates" at such high speeds of rotation, and bursts. On the other hand, a rolled or pleated set of bellows can also fail because is comes into contact with a pointed or bent region of a sheet-metal cap, for example, or the like, as a result of the centrifugal forces.

SUMMARY OF THE INVENTION

In contrast, it is the task of the present invention to make available a homokinetic joint having a sealing arrangement of the type stated initially, which is sealed to prevent the penetration of foreign particles and the exit of lubricant even before its assembly on a shaft.

This task is accomplished, according to the invention, essentially in that the sealing arrangement has a set of bellows, which is articulated onto the outer hub and/or a carrier housing that surrounds the latter, with its radially outer edge, and is attached in stationary manner to the inner hub, with its radially inner edge. Therefore the homokinetic joint, together with the sealing arrangement, forms a sealed and finished unit, which can be set directly onto a shaft with the inner hub. Therefore no additional work is required to attach the sealing arrangement to the shaft during or after assembly. At the same time, the penetration of contaminants into the region located between the inner hub and the outer hub, containing the balls and the cage, is already prevented, even during transport. The carrier housing that might be provided can be an integral part of the shaft or be connected with it. O-rings or similar additional sealing arrangements, which are generally necessary for a seal in the case of conventional joints, in order to achieve a good sealing effect between the inner and the outer hub, do not have to be provided in the case of the joint sealed according to the invention.

According to a first embodiment of the invention, the homokinetic joint is configured as a fixed joint, whereby the set of bellows has at least one pleat. Preferably, in this connection, the peaks of several pleats run essentially in one plane, which lies approximately perpendicular to the axis of the inner hub, in a section of the set of bellows that lies between the outer edge, which is articulated onto the carrier housing, and the inner edge, which is articulated onto the inner hub. In a cross-section along the axis of the inner hub, the pleats therefore lie essentially on top of one another in the radial direction, so that even at high speeds of rotation, inflation or bulging of the set of bellows cannot occur. In this connection, the pleats do not have to lie precisely in a plane, but rather can be slightly offset from one another in the axial direction, so that they do, however, essentially cover one another.

The maximal operational incline angle between the inner hub and the outer hub can amount to approximately 10° in the case of a fixed joint according to the invention. The maximal installation incline angle between the inner hub and the outer hub can be greater than 10° and amount to approximately 15°, for example.

According to another embodiment of the invention, the homokinetic joint is configured as a displaceable joint whose set of bellows has several pleats, of which at least two pleats are disposed next to one another in the axial direction of the inner hub. These pleats that are disposed next to one another make it possible to displace the inner hub relative to the outer hub, without the sealing effect of the set of bellows being impaired thereby. In this connection, the number of pleats that lie next to one another is dependent on the displacement paths that occur during operation and during installation, and is determined on an application-specific basis.

Preferably, in the case of a displaceable homokinetic joint according to the invention, the peaks of two adjacent pleats are oriented at an angle between approximately 120° and approximately 60° relative to one another. In this way, different functions are assigned to different pleats. Thus, the pleats that are disposed next to one another in the axial direction can balance out an axial displacement between the inner hub and the outer hub, while one or more pleats disposed next to one another in the radial direction can balance out an incline of the joint.

In the case of a displaceable homokinetic joint according to the invention, the maximal operational incline angle between the inner hub and the outer hub amounts to approximately 3°, while the maximal installation incline angle amounts to approximately 8°. The permissible displacement paths between the inner hub and the outer hub during operation can lie between 5 mm and approximately 90 mm. The number of pleats of the set of bellows can be varied individually, for different joints, in accordance with the required displacement paths and incline angles.

In order to attach the set of bellows, the latter is preferably crimped and/or clamped into a cap that surrounds the outer hub and/or the carrier housing, at least in certain regions, in the case of a homokinetic joint according to the invention. In this connection, the radially outer edge of the set of bellows is preferably crimped in at a defined pressure, so that the set of bellows is firmly fixed in place on the cap, on the one hand, but on the other hand is not damaged during crimping or clamping.

Damage to the set of bellows due to high centrifugal forces can be avoided in that the cap has an approximately cylindrical section that extends away from the outer hub, which extends in the axial direction of the inner hub up to the vicinity of the region in which the radially inner edge of the set of bellows is fixed in place on the inner hub. The cylindrical, slightly conical section or stepped region of the cap, which section/region extends away from the outer hub, serves as a contact surface that enters into contact with the set of bellows when the latter inflates due to centrifugal forces at high revolutions. Therefore the set of bellows does not come into contact with sharp-edged or pointed regions of the cap, but rather rests against an essentially smooth surface, which prevents overly great inflation of and damage to the set of bellows. In the case of a fixed homokinetic joint, this region of the cap, which projects away from the outer hub, is configured to be comparatively short, since the pleats of the set of bellows lie essentially on top of one another in the radial direction. In the case of a displaceable homokinetic joint, however, this region of the cap clearly projects away further from the outer hub.

The inner edge of the set of bellows can be fixed in place on the inner hub by means of a strap, a tie, a spring ring, or the like, in such a manner that it is held in place in a fixed location on the inner hub during operation. For repair or maintenance work, however, the inner edge of the set of bellows can be released from the inner hub, and is not displaceable on the inner hub only at the stresses that occur during operation. Exit of lubricant or penetration of dirt can therefore be avoided. Alternatively to this, it is also possible to fix the inner edge of the set of bellows in place on the inner hub in that a sheet-metal ring is vulcanized into the edge, and the inner edge of the set of bellows is drawn onto the inner hub with a press fit, i.e. under tension.

Preferably, the set of bellows consists of rubber or another suitable, for example rubber-like plastic, which has a relatively great rigidity of more than 65 Shore, for example approximately 70 Shore. Because of this rigidity of the material of the set of bellows, the ability of the set of bellows to withstand stress is increased, and the deformations that occur during operation are limited.

In a further development of the idea of the invention, a closure lid is provided on the side of the homokinetic joint that faces away from the set of bellows. This closure lid can be pressed into the carrier housing, for example, forming a seal, so that the homokinetic joint is closed off, on both sides, by the closure lid and the set of bellows. Therefore it is not necessary to provide O-rings or similar additional seals on the homokinetic joint according to the invention.

The set of bellows of the joint according to the invention is already well protected against raccoon damage or the like by means of the section that projects away from the cap. Further improved security against such damage can be achieved in that the set of bellows is disposed on a transmission or differential side of the joint, and the outer hub and/or the carrier housing are connected with a shaft. The set of bellows therefore does not face the shaft (for example in the case of installation of the joint into a longitudinal shaft of a vehicle), but rather faces the transmission or differential side of the joint, so that because of the construction space of the transmission, there is only a slight attack surface available for raccoon damage or the like. Furthermore, because of the connection of the inner hub on which the set of bellows is fixed, on the transmission or differential side, improved centering of the shaft attached to the outer hub or to the carrier housing, respectively, can be achieved.

BRIEF DESCRIPTION OF THE DRAWINGS

The invention will be explained in greater detail below, using exemplary embodiments, and making reference to the drawing. The drawing schematically shows.

DETAILED DESCRIPTION OF PREFERRED EMBODIMENTS

Figure 1:
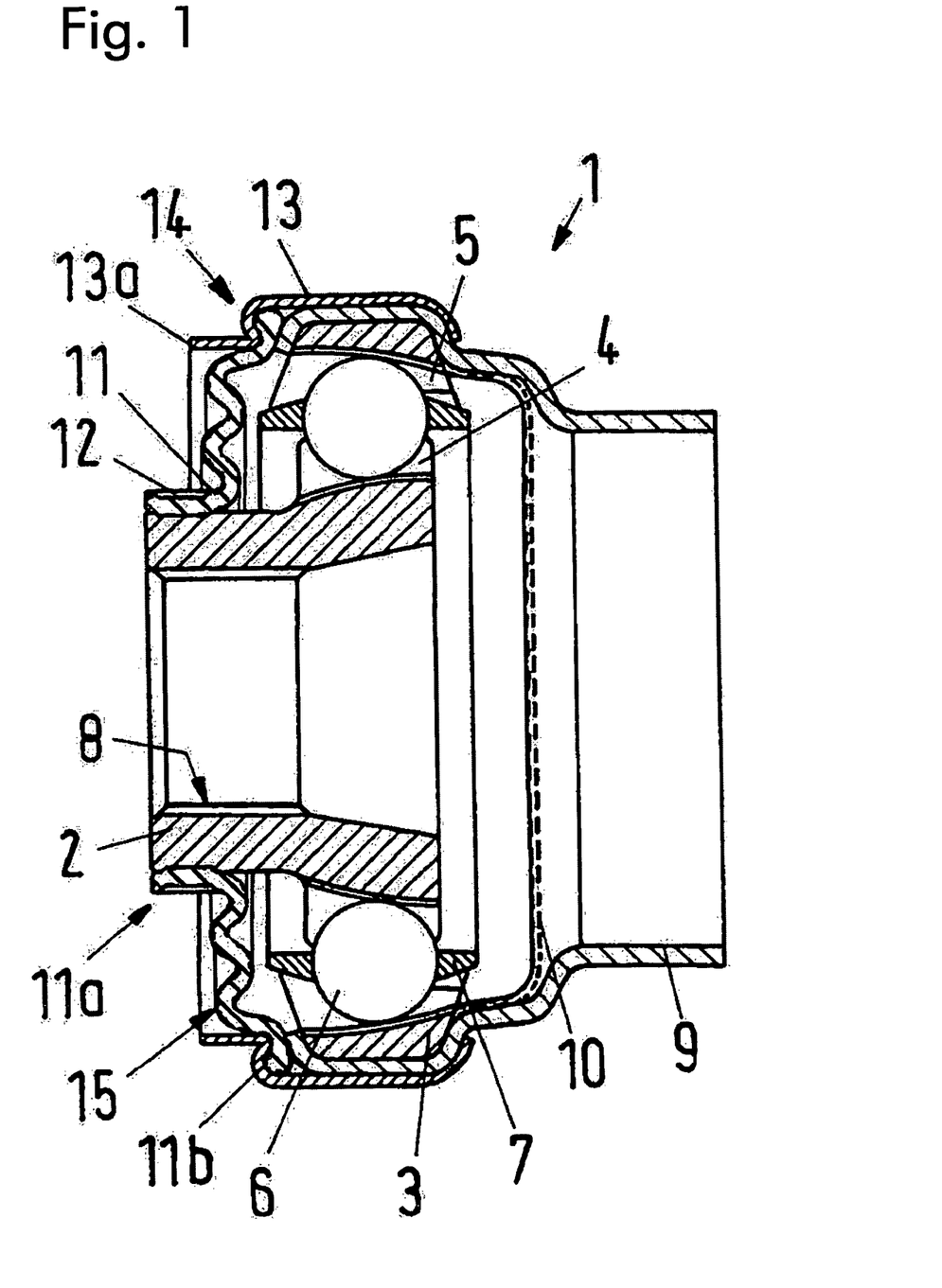
FIG. 1 shows a fixed homokinetic joint having a sealing arrangement, in a cross-sectional view.

The homokinetic joint shown in FIG. 1 is configured as a fixed joint 1, which has an inner hub 2 and an outer hub 3. Tracks 4 and 5, respectively, assigned to one another in pairs, in each instance, and in which balls 6 are accommodated, are provided in the inner hub 2 and the outer hub 3. The balls 6 are guided in a cage 7. For this purpose, the cage 7 has windows distributed over its circumference, in accordance with the number of balls.

For a connection to a driven shaft or a shaft to be driven, the inner hub 2 has a central recess that is provided with a profiling 8 for transferring torque. In this manner, the inner hub 2 can be set, for example, onto a shaft journal (not shown) of a transmission or differential, for assembly of the joint, so that particularly good centering of the joint is possible.

In the embodiment shown, the outer hub 3 is surrounded by a carrier housing 9, with a non-positive or positive lock. This carrier housing 9 in turn can be connected with a shaft, with its end that is on the right in the figure, in suitable manner, for example by means of being welded to a hollow shaft.

To seal the homokinetic joint 1, a closure lid 10 is inserted into the carrier housing 9. The closure lid 10 is pressed in between the outer hub 3 and a shoulder of the carrier housing 9, for example, when the outer hub 3 is inserted into the carrier housing 9. The closure lid 10 therefore sits in the carrier housing 9, sealed in such a manner that penetration of dirt particles into the joint 1, or loss of lubricant can be prevented, without providing additional sealing elements.

A set of bellows 11 is disposed on the left side of the homokinetic joint 1, in FIG. 1. The set of bellows 11 has a radially inner edge 11a that is fixed in place on the inner hub 2 during operation by means of a tie 12. In this connection, the tie 12 holds the inner edge 11a of the set of bellows 11 fixed in place on the inner hub 2, in such a manner that slipping of the set of bellows on the inner hub does not occur during operation of the homokinetic joint 1. The radially outer edge 11b of the set of bellows 11 is attached to a cap 13 that surrounds the carrier housing 9 and the outer hub 3, by means of a crimp 14. The cap 13 furthermore has a section 13a that projects away from the outer hub 3, which section follows the crimp 14. The section 13a is configured essentially as a cylinder, and extends up to the vicinity of the region in which the set of bellows 11 is fixed in place on the inner hub 2 by means of the tie 12, in the axial direction of the inner hub 2, in the installed position. Therefore the section 13a forms an essentially smooth contact surface for the set of bellows 11, when the latter is pressed outward due to centrifugal forces.

In the embodiment shown, the set of bellows 11 has two pleats 15, which lie essentially next to one another in the radial direction. The peaks of the pleats 15 are offset only slightly relative to one another, and lie approximately in one plane. Since the section 13a of the cap 13 extends into the region in which the set of bellows 11 is fixed in place on the inner hub 2, the section 13a of the cap 13 surrounds the pleats 15. This ensures that the pleats 15 can come into contact, at most, with the smooth inner surface of the section 13a, but not with its edge that projects away from the outer hub 3, even at high speeds of rotation of the joint 1.

Figure 2:
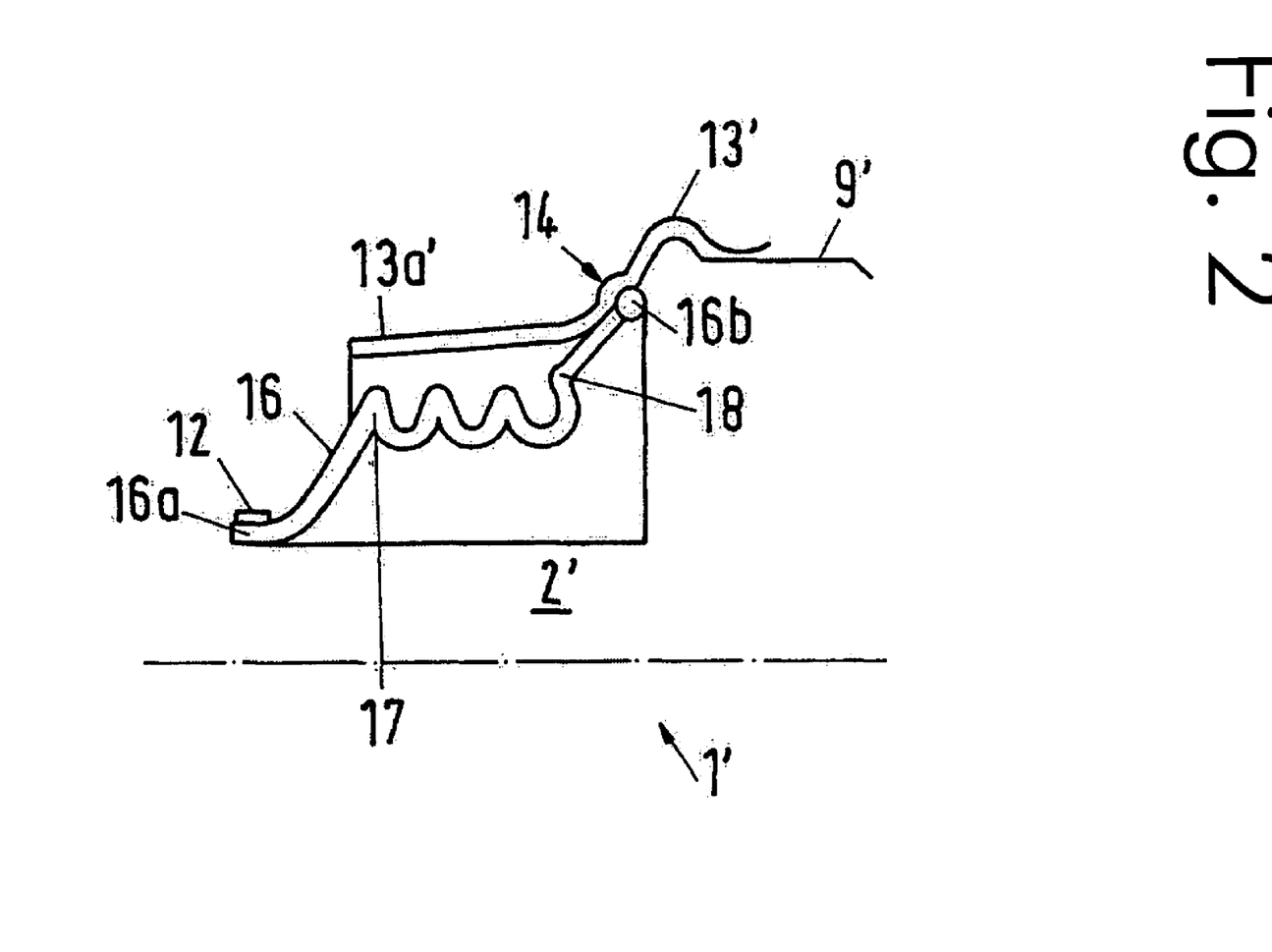
FIG. 2 shows details of a displaceable homokinetic joint having a Sealing arrangement, in a cross-sectional view.

FIG. 2 schematically indicates a displaceable joint 1', whereby only the inner hub 2' and the carrier housing 9' are shown, in order to make the illustration clearer. The carrier housing 9' is surrounded by a cap 13' in some regions, in which cap the radially outer edge 16b of a set of bellows 16 is attached by means of a crimp 14. The radially inner edge 16a of the set of bellows 16 is fixed in place on the inner hub 2', by means of a tie 12, in the manner described above, in such a manner that it is not displaced on the inner hub 2' in operation.

In the embodiment shown, the set of bellows 16 has three pleats 17, which are disposed next to one another in the axial direction of the displaceable joint 1'. Furthermore, a pleat 18 is provided in the set of bellows 16, the peak of which extends essentially at a right angle to the peaks of the pleats 17. In this connection, the pleats 17 serve to balance out an axial displacement of the inner hub 2' relative to the outer hub (not shown) with the carrier housing 9'. In contrast, the pleat 18 serves to balance out an incline angle between the inner hub 2' and the outer hub.

As described above with reference to FIG. 1, a section 13a' of the cap 13' extends away from the outer hub, from the crimp 14, also in the embodiment shown in FIG. 2. In the installed position, this section 13a' projects into the vicinity of the region in which the radially inner edge 16a of the set of bellows 16 is fixed in place on the inner hub 2'. In this connection, the section 13a' forms a smooth-walled contact surface with which the peaks of the pleats 17 can enter into contact at high speeds of rotation of the displaceable joint 1'.

In deviation from the approximately cylindrical section 13a or 13a', respectively, shown in the figures, this section can also run slightly conically or with offset steps, whereby the inner surface that faces the set of bellows is configured without sharp edges or projections, if at all possible.

Figure 3:
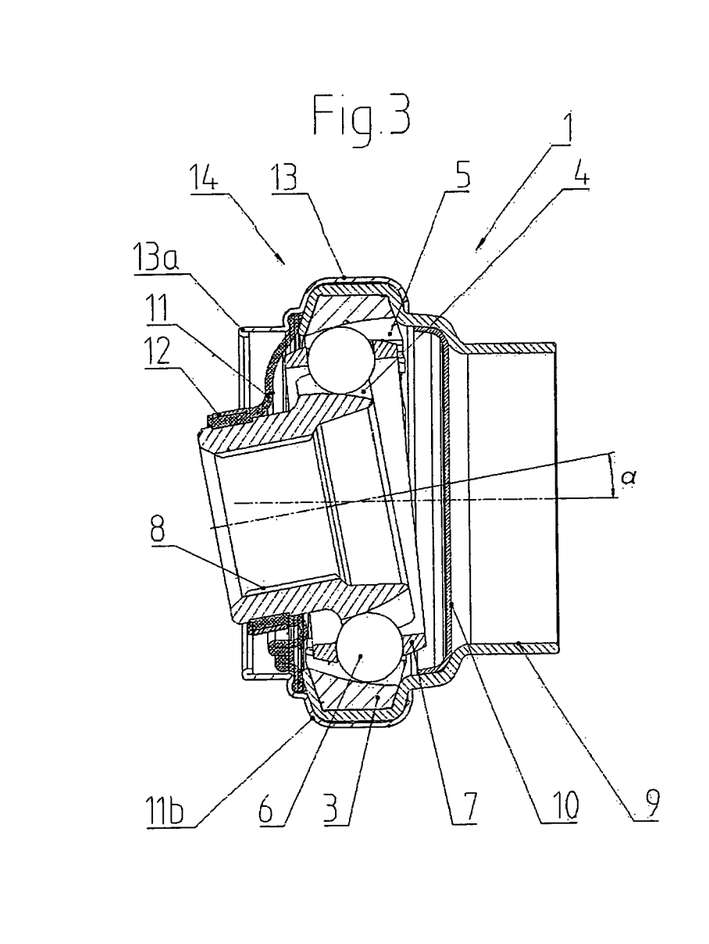
FIG. 3 shows the embodiment of FIG. 1 with the operational incline angle indicated.
Figure 4:
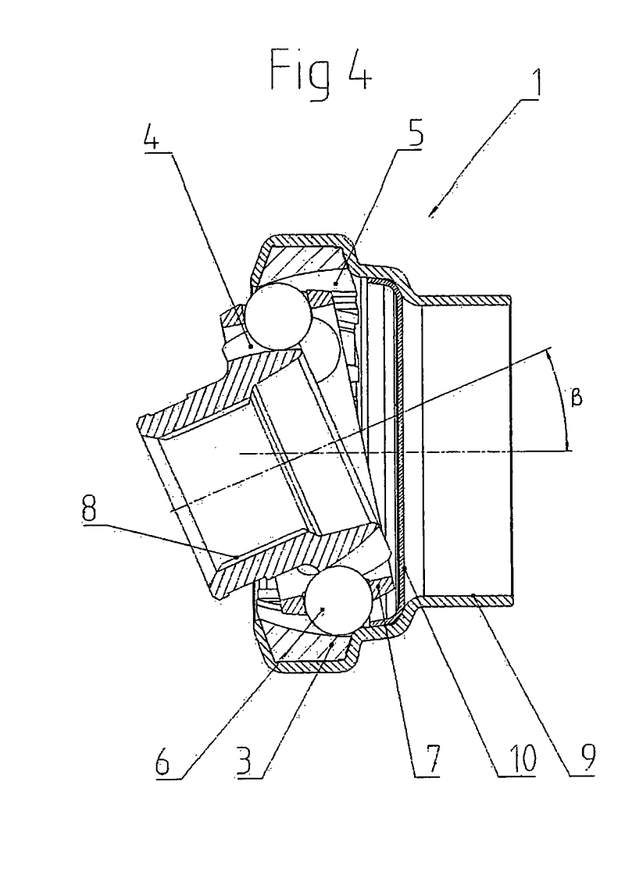
FIG. 4 shows the embodiment of FIG. 1 with the installation incline angle indicated.

FIG. 3 shows the operational incline angle α of a fixed homokinetic joint according to the invention. FIG. 4 shows the installation incline angle β of a fixed homokinetic joint according to the invention.

Figure 5:
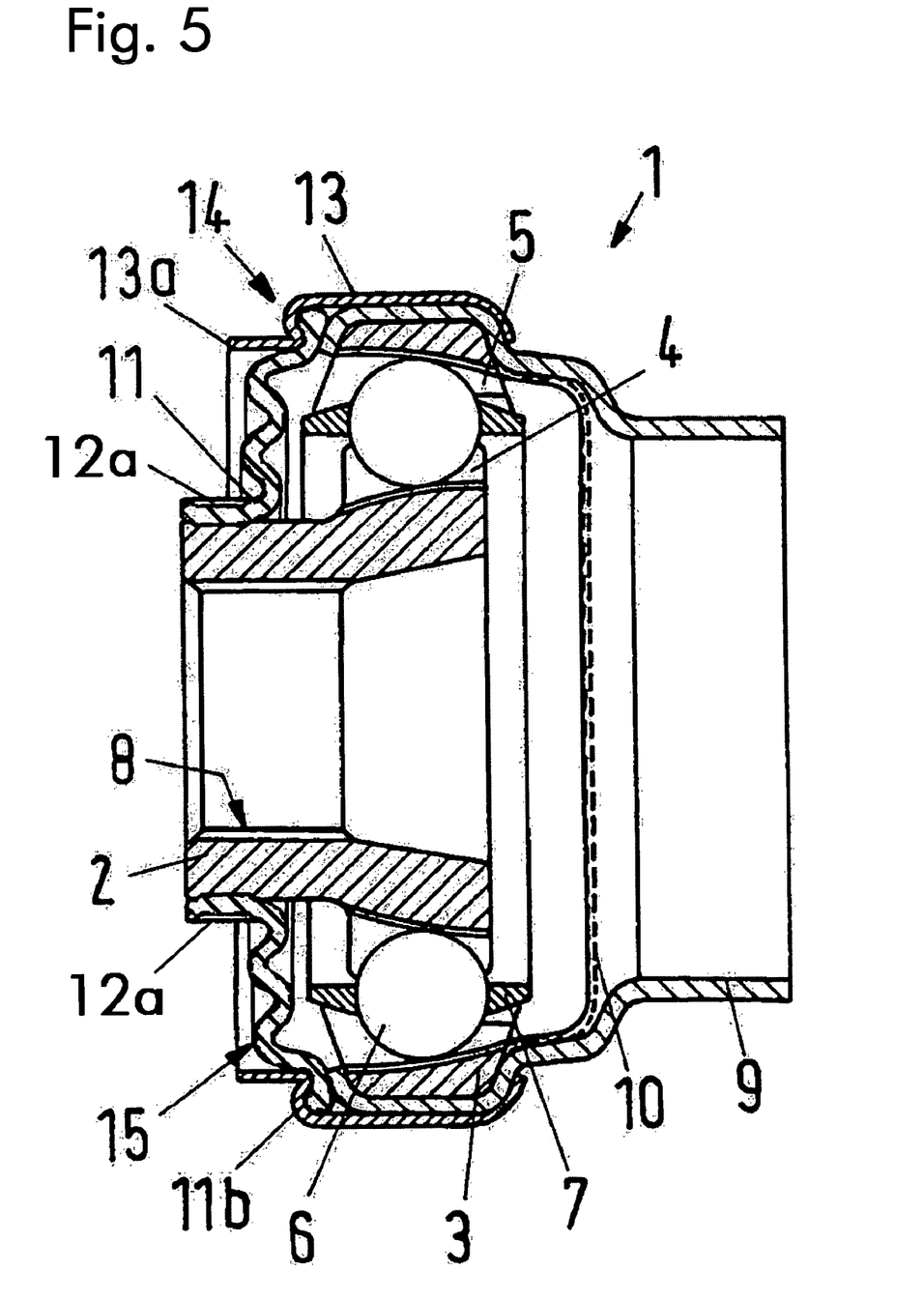
FIG. 5 shows a fixed homokinetic joint with a spring ring fixing the bellows in place on the inner hub.
Figure 6:
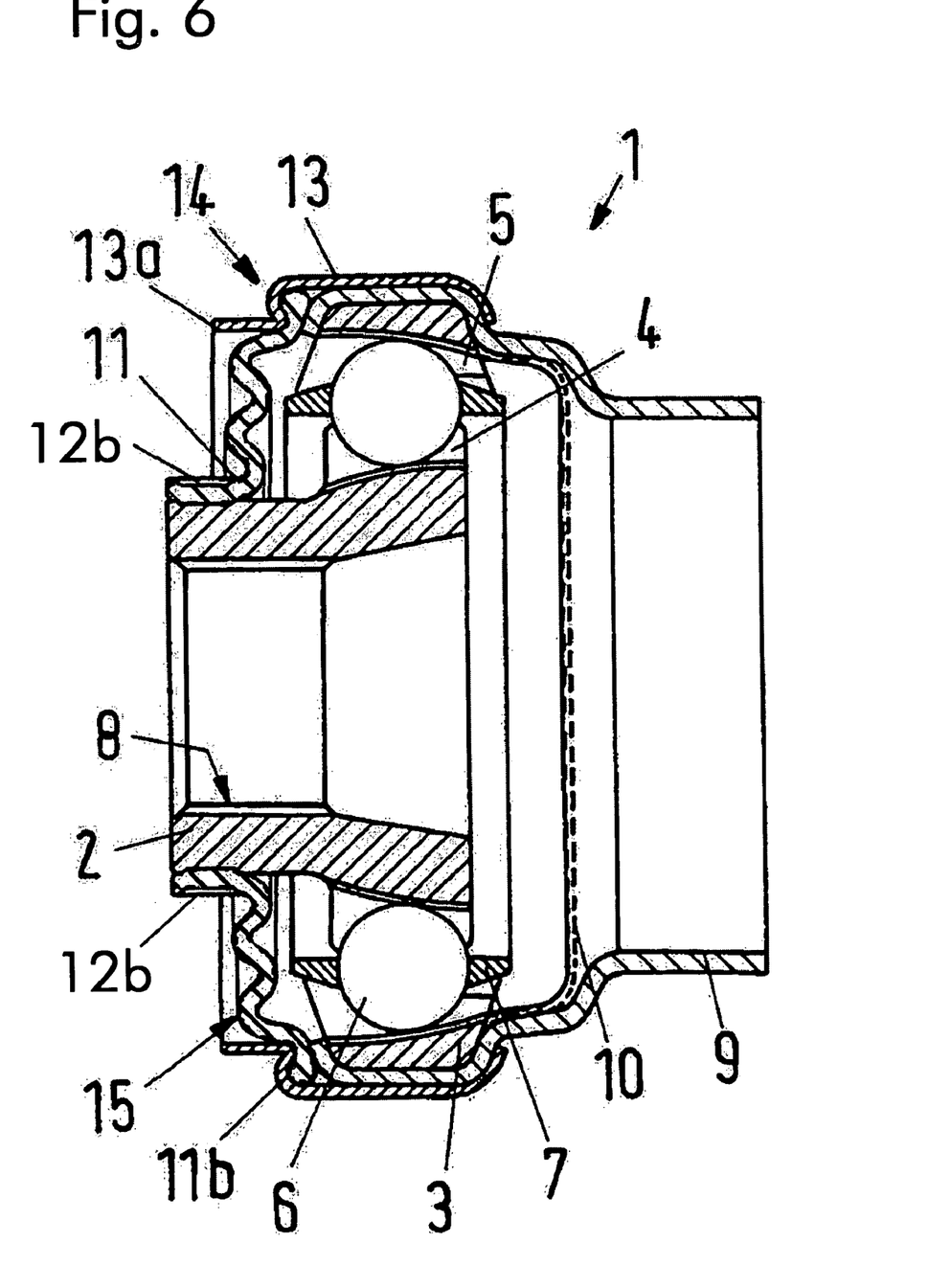
FIG. 6 shows a fixed homokinetic joint with a strap fixing the bellows in place on the inner hub.

FIG. 5 shows a fixed homokinetic joint with a radially inner edge 11a of the bellows 11 fixed in place on the inner hub 2 during operation by means of a strap 12a. FIG. 6 shows a fixed homokinetic joint with a radially inner edge 11a of the bellows 11 fixed in place on the inner hub 2 during operation by means of a spring ring 12b.

Figure 7:
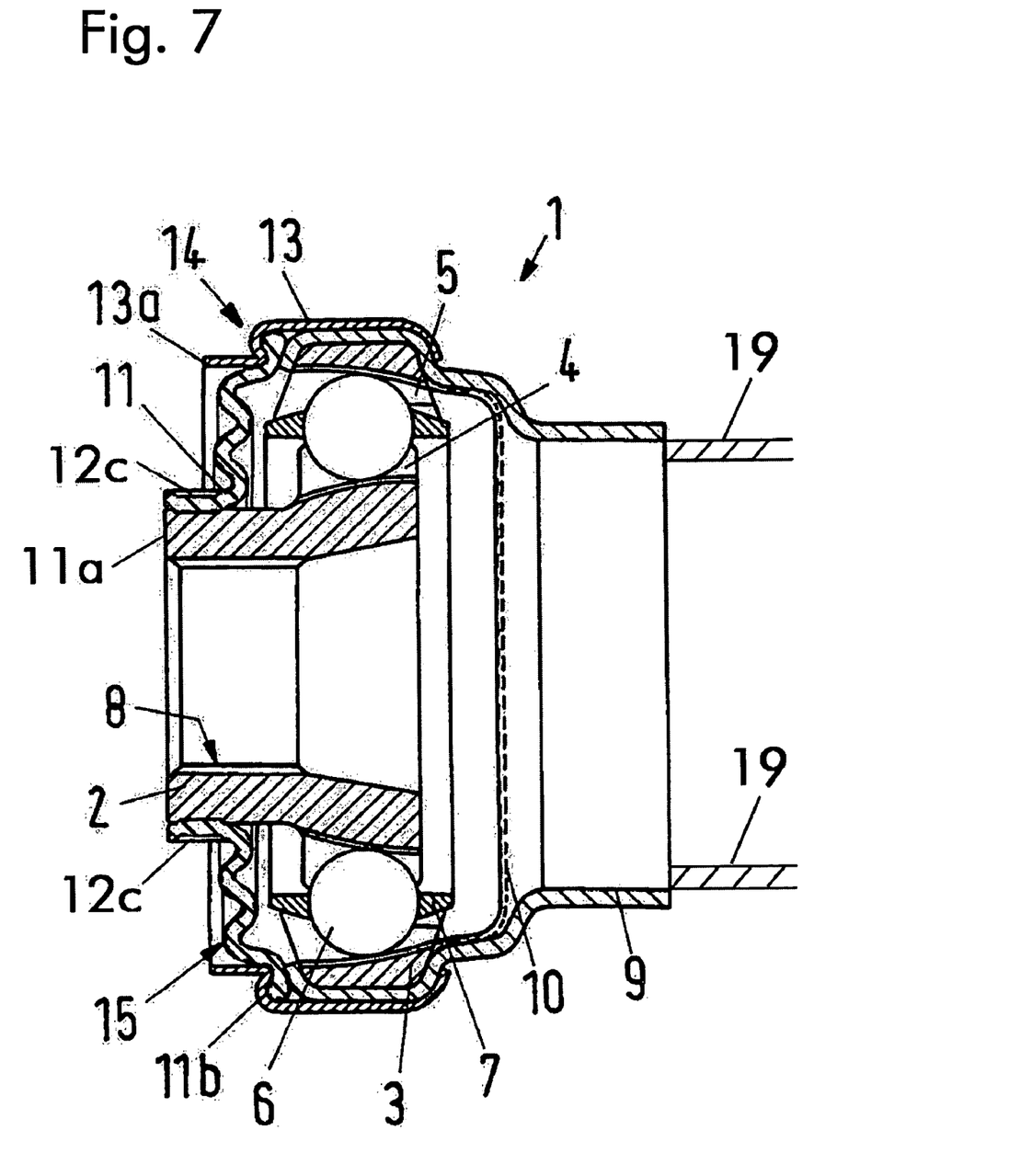
FIG. 7 shows a fixed homokinetic joint with a sheet-metal ring vulcanized into the radially inner edge of the bellows and the bellows drawn onto the outer hub with a press fit, and the carrier housing connected with a shaft.
Figure 8:
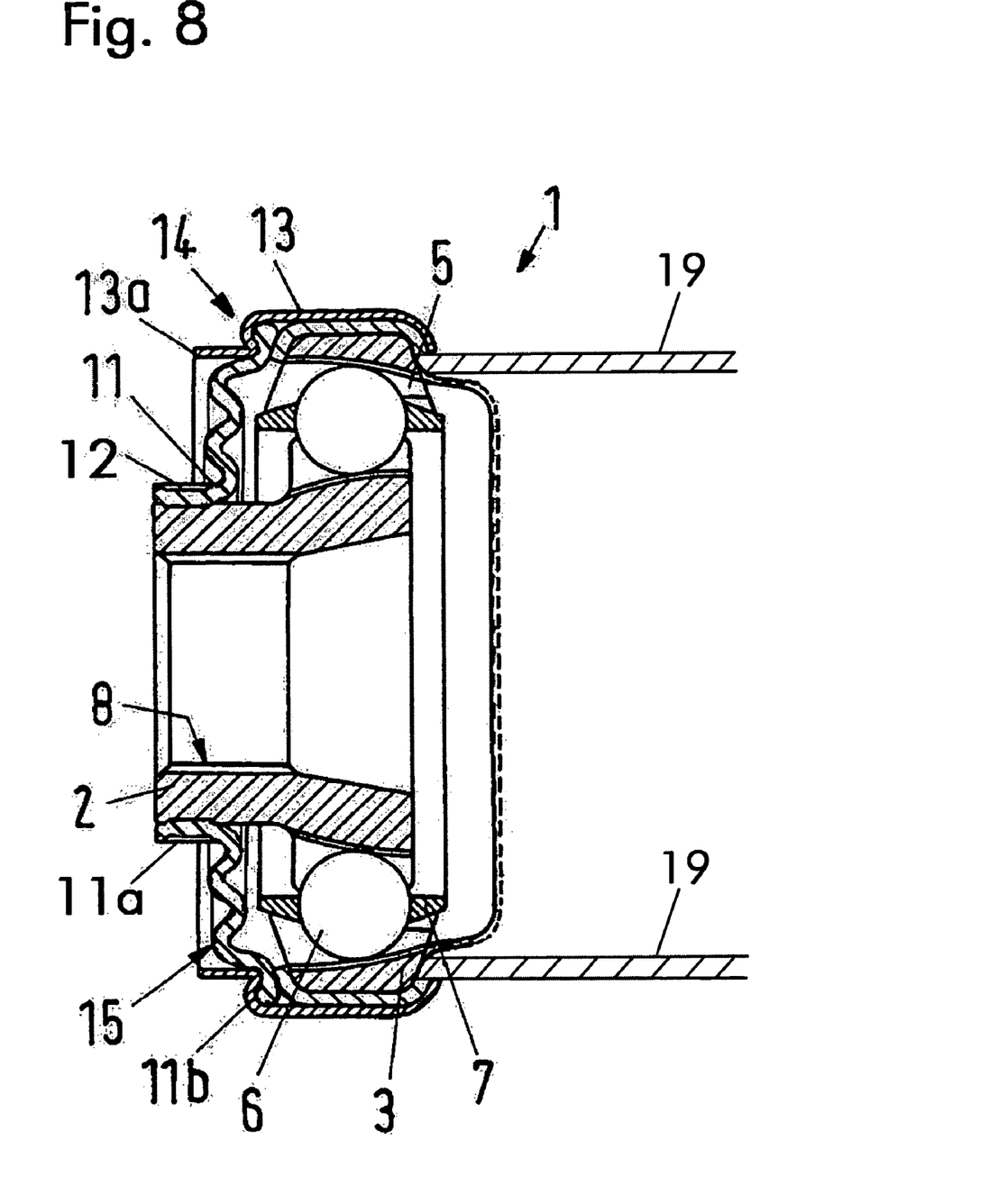
FIG. 8 shows a fixed homokinetic joint with the outer hub connected with a shaft.

FIG. 7 shows a fixed homokinetic joint with a sheet-metal ring 12c vulcanized into the radially inner edge 11a of the bellows 11 and the radially inner edge 11a of the bellows 11 drawn onto the inner hub 2 with a press fit. FIG. 7 also shows the carrier housing 9 connected with shaft 19. FIG. 8 shows outer hub 3 connected with shaft 19. In FIGS. 7 and 8, the bellows 11 is disposed on a transmission or differential side of the joint.

REFERENCE SYMBOL LIST

1 fixed homokinetic joint
1' displaceable homokinetic joint
2, 2' inner hub
3 outer hub
4 track of the inner hub
5 track of the outer hub
6 ball
7 cage
8 inner profiling
9, 9' carrier housing
10 closure lid
11 set of bellows
11a radially inner edge of the set of bellows
11b radially outer edge of the set of bellows
12 tie
12a strap
12b spring ring
12c sheet-metal ring
13 cap
13a, 13a' section of the cap
14 crimp
15 pleat
16 set of bellows
16a radially inner edge of the set of bellows
16b radially outer edge of the set of bellows
17 pleat
18 pleat
19 shaft

The invention claimed is:

1. A fixed homokinetic joint comprising:
   (a) an inner hub;
   (b) an outer hub;
   (c) a carrier housing encompassing and surrounding the outer hub;
   (d) a plurality of tracks associated together in pairs provided in each of said inner hub and said outer hub;
   (e) a plurality of balls received in said tracks;

(f) a cage guiding said balls to transfer a torque between said inner hub and said outer hub;

(g) a sealing arrangement comprising a bellows having a plurality of folds, a radially outer edge and a radially inner edge, said outer edge being coupled to the carrier housing and the inner edge being coupled to the inner hub with the crests of the folds which are located in a section between the outer edge and the inner edge running essentially in one plane located approximately perpendicular to an axis of the inner hub;

(h) a closure cover which is not integrally formed with either the outer hub or the carrier housing and which is pressed into the carrier housing to form a seal; and (i) a cap encompassing and surrounding the carrier housing and the outer hub.

2. The fixed homokinetic joint according to claim 1, wherein the radially outer edge of the bellows is crimped and/or clamped into the cap.

3. The fixed homokinetic joint according to claim 2, wherein the cap has an approximately cylindrical section that extends away from the outer hub and extends in an axial direction of the inner hub up to the vicinity of the region in which the radially inner edge of the bellows is fixed to the inner hub.

4. The fixed homokinetic joint according to claim 1, wherein the radially inner edge of the bellows is fixed in place on the inner hub during operation by a strap, a tie, and/or a spring ring.

5. The fixed homokinetic joint according to claim 1, wherein a sheet-metal ring is vulcanized into the radially inner edge of the bellows, and wherein the radially inner edge of the bellows is drawn onto the inner hub with a press fit.

6. The fixed homokinetic joint according to claim 1, wherein the bellows is disposed on a transmission or differential side of the joint, and the outer hub and/or the carrier housing are connected with a shaft.

7. The fixed homokinetic joint according to claim 1, wherein the radially inner edge of the bellows is releasably fixed in place on the inner hub.

* * * * *

UNITED STATES PATENT AND TRADEMARK OFFICE
CERTIFICATE OF CORRECTION

PATENT NO. : 7,736,239 B2
APPLICATION NO. : 10/569865
DATED : June 15, 2010
INVENTOR(S) : Niederhüfner et al.

It is certified that error appears in the above-identified patent and that said Letters Patent is hereby corrected as shown below:

In particular, on the cover page, Item [73], please correct the Assignee information to correctly read as follows: --Shaft-Form-Engineering GmbH, Mühlheim, DE--.

Signed and Sealed this

Twenty-fourth Day of August, 2010

David J. Kappos
*Director of the United States Patent and Trademark Office*